United States Patent
Goden (10) Patent No.: US 7,432,907 B2
(45) Date of Patent: Oct. 7, 2008

(54) DRIVING METHOD OF ELECTROPHORETIC DISPLAY DEVICE

(75) Inventor: Tatsuhito Goden, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 275 days.

(21) Appl. No.: 10/530,317

(22) PCT Filed: Mar. 3, 2004

(86) PCT No.: PCT/JP2004/002688

§ 371 (c)(1),
(2), (4) Date: Jan. 19, 2006

(87) PCT Pub. No.: WO2004/079703

PCT Pub. Date: Sep. 16, 2004

(65) Prior Publication Data

US 2006/0139304 A1    Jun. 29, 2006

(30) Foreign Application Priority Data

Mar. 4, 2003  (JP) ............................. 2003-057211

(51) Int. Cl.
*G09G 3/34* (2006.01)
(52) U.S. Cl. .................................................... 345/107
(58) Field of Classification Search ............. 345/107
See application file for complete search history.

(56) References Cited

U.S. PATENT DOCUMENTS

| 6,144,361 | A | 11/2000 | Gordon, II et al. |
| 6,753,844 | B2* | 6/2004 | Machida et al. ............. 345/107 |
| 6,795,229 | B2* | 9/2004 | Liang et al. ................. 359/296 |
| 7,012,600 | B2* | 3/2006 | Zehner et al. ............... 345/214 |
| 2002/0145792 | A1 | 10/2002 | Jacobson |
| 2002/0196207 | A1 | 12/2002 | Machida et al. |
| 2003/0035198 | A1* | 2/2003 | Liang et al. ................. 359/296 |

* cited by examiner

*Primary Examiner*—Bipin Shalwala
*Assistant Examiner*—Steven E Holton
(74) *Attorney, Agent, or Firm*—Morgan & Finnegan, LLP (57) ABSTRACT

An electrophoretic display device includes a plurality of electrophoretic particles and an insulating liquid which are held in a container, a first electrode and a second electrode which are disposed close to the insulating liquid, and means for applying voltages between the first electrode and the second electrode. The electrophoretic display device exhibits a display state including a first state in which the electrophoretic particle are dispersed in the insulating liquid by applying an AC voltage between the first and second electrodes, a second state in which the electrophoretic particles are attracted toward the first electrode by applying a DC voltage of one polarity between the first and second electrodes, and third state in which the electrophoretic particles are attracted toward by applying a DC voltage of the other polarity between the first and second electrodes. The second and third states are exhibited alternately.

4 Claims, 10 Drawing Sheets

| A | A | A | A | A | A | A |
|---|---|---|---|---|---|---|
| A | A | A | A | A | A | A |
| A | A | A | A | A | A | A |
| A | A | A | A | A | A | A |
| A | A | A | A | A | A | A |
| A | A | A | A | A | A | A |
| A | A | A | A | A | A | A |
| A | A | A | A | A | A | A |

(b)

| B | B | B | B | B | B | B |
|---|---|---|---|---|---|---|
| B | B | B | B | B | B | B |
| B | B | B | B | B | B | B |
| B | B | B | B | B | B | B |
| B | B | B | B | B | B | B |
| B | B | B | B | B | B | B |
| B | B | B | B | B | B | B |
| B | B | B | B | B | B | B |

(c)

| A | A | A | A | A | A | A |
|---|---|---|---|---|---|---|
| A | A | A | A | A | A | A |
| A | A | A | A | A | A | A |
| A | A | A | A | A | A | A |
| A | A | A | A | A | A | A |
| A | A | A | A | A | A | A |
| A | A | A | A | A | A | A |
| A | A | A | A | A | A | A |

(d)

| C | C | C | C | C | C | C |
|---|---|---|---|---|---|---|
| C | C | C | C | C | C | C |
| C | C | C | C | C | C | C |
| C | C | C | C | C | C | C |
| C | C | C | C | C | C | C |
| C | C | C | C | C | C | C |
| C | C | C | C | C | C | C |
| C | C | C | C | C | C | C |

| A | A | A | A | A | A | A | A |
|---|---|---|---|---|---|---|---|
| A | A | A | A | A | A | A | A |
| A | A | A | A | A | A | A | A |
| A | A | A | A | A | A | A | A |
| A | A | A | A | A | A | A | A |
| A | A | A | A | A | A | A | A |
| A | A | A | A | A | A | A | A |
| A | A | A | A | A | A | A | A |

(b)

| B | B | B | B | B | B | B | B |
|---|---|---|---|---|---|---|---|
| C | C | C | C | C | C | C | C |
| B | B | B | B | B | B | B | B |
| C | C | C | C | C | C | C | C |
| B | B | B | B | B | B | B | B |
| C | C | C | C | C | C | C | C |
| B | B | B | B | B | B | B | B |
| C | C | C | C | C | C | C | C |

(c)

| A | A | A | A | A | A | A | A |
|---|---|---|---|---|---|---|---|
| A | A | A | A | A | A | A | A |
| A | A | A | A | A | A | A | A |
| A | A | A | A | A | A | A | A |
| A | A | A | A | A | A | A | A |
| A | A | A | A | A | A | A | A |
| A | A | A | A | A | A | A | A |
| A | A | A | A | A | A | A | A |

(d)

| C | C | C | C | C | C | C | C |
|---|---|---|---|---|---|---|---|
| B | B | B | B | B | B | B | B |
| C | C | C | C | C | C | C | C |
| B | B | B | B | B | B | B | B |
| C | C | C | C | C | C | C | C |
| B | B | B | B | B | B | B | B |
| C | C | C | C | C | C | C | C |
| B | B | B | B | B | B | B | B |

| A | A | A | A | A | A | A | A |
|---|---|---|---|---|---|---|---|
| A | A | A | A | A | A | A | A |
| A | A | A | A | A | A | A | A |
| A | A | A | A | A | A | A | A |
| A | A | A | A | A | A | A | A |
| A | A | A | A | A | A | A | A |
| A | A | A | A | A | A | A | A |
| A | A | A | A | A | A | A | A |

(b)

| B | C | B | C | B | C | B | C |
|---|---|---|---|---|---|---|---|
| C | B | C | B | C | B | C | B |
| B | C | B | C | B | C | B | C |
| C | B | C | B | C | B | C | B |
| B | C | B | C | B | C | B | C |
| C | B | C | B | C | B | C | B |
| B | C | B | C | B | C | B | C |
| C | B | C | B | C | B | C | B |

(c)

| A | A | A | A | A | A | A | A |
|---|---|---|---|---|---|---|---|
| A | A | A | A | A | A | A | A |
| A | A | A | A | A | A | A | A |
| A | A | A | A | A | A | A | A |
| A | A | A | A | A | A | A | A |
| A | A | A | A | A | A | A | A |
| A | A | A | A | A | A | A | A |
| A | A | A | A | A | A | A | A |

(d)

| C | B | C | B | C | B | C | B |
|---|---|---|---|---|---|---|---|
| B | C | B | C | B | C | B | C |
| C | B | C | B | C | B | C | B |
| B | C | B | C | B | C | B | C |
| C | B | C | B | C | B | C | B |
| B | C | B | C | B | C | B | C |
| C | B | C | B | C | B | C | B |
| B | C | B | C | B | C | B | C |

DRIVING METHOD OF ELECTROPHORETIC DISPLAY DEVICE

TECHNICAL FIELD

The present invention relates to an electrophoretic display device which effects display on the basis of movement of electrophoretic particles (charged migration particles) and a method of driving the electrophoretic display device.

BACKGROUND ART

In recent years, an electrophoretic display device which effects display by moving electrophoretic particles under voltage application, has received attention as a non-light emission type display device.

This type of the electrophoretic display device, according to U.S. Pat. No. 6,144,361, includes a pair of substrates disposed with a predetermined spacing, an insulating liquid filled in the spacing, a large number of electrophoretic particles (charged migration particles) dispersed in the insulating liquid, and a pair of electrodes disposed so as to be close to the insulating liquid.

Figure 12:
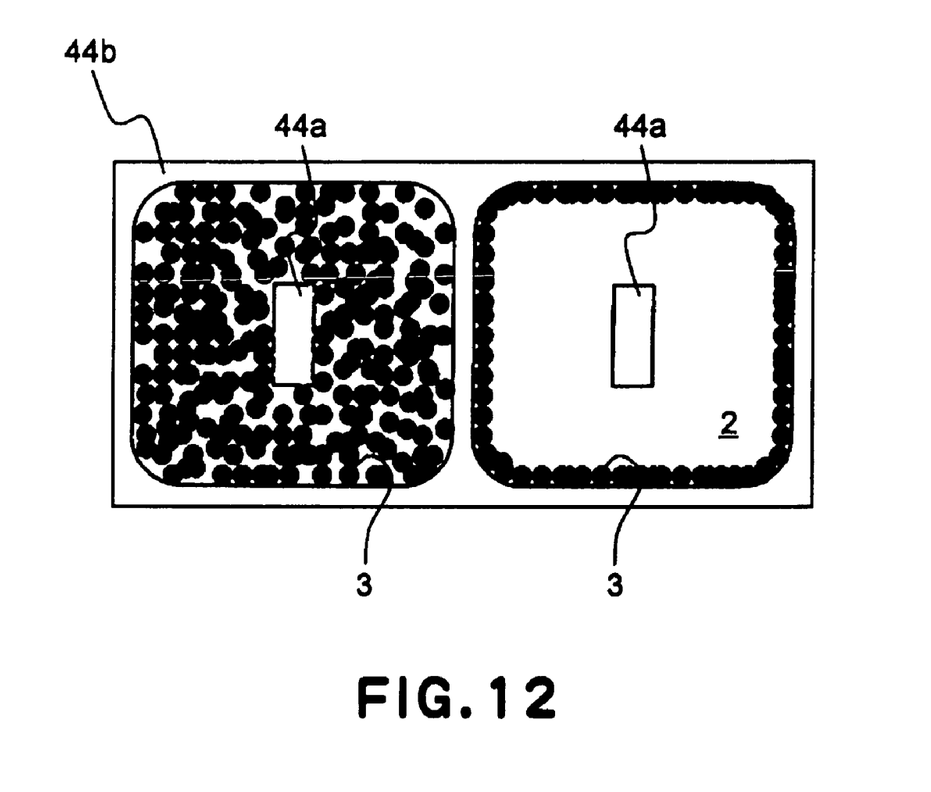
FIG. 12 is a schematic plan view showing an embodiment of a conventional electrophoretic display device.

The electrophoretic display device effects various displays, e.g., by utilizing a difference in color between the case of disposing (dispersing) electrophoretic particles 3 in a wide area (the left-hand pixel shown in FIG. 12) and the case of disposing (correcting) the electrophoretic particles in a narrow area (the right-hand pixel shown in FIG. 12). In FIG. 12, two pixel portions of the electrophoretic display device are shown, and each pixel includes the electrophoretic particles 3, an insulating liquid 2, one electrode 44*a*, and the other electrode 44*b* disposed so as to partition the two pixels.

When the electrophoretic display device is subjected to display of an identical image for a long time (e.g., when only one of the display states shown at the right-hand and left-hand pixels in FIG. 12 is kept for a long time), the associated pixel is continuously supplied with the same electric field for a long time, so that a spade charge distribution is created due to, e.g., presence of ions in a dispersion liquid, thus resulting in a residual DC (voltage) component. As a result, when another display is effected, an electric field is modulated by the residual DC component, so that deviation form a desired writing level (i.e., display burning) is caused to occur. This problem arises not only in the case of continuously effecting the same display for a long time but also in the case of effecting display intermittently for a long time.

DISCLOSURE OF THE INVENTION

Accordingly, the present invention has accomplished in view of the above mentioned problem.

More specifically, an object of the present invention is to provide an electrophoretic display device capable of preventing display burning.

Another object of the present invention is to provide a method of driving the electrophoretic display device.

According to the present invention, there is provided an electrophoretic display device, comprising:

a plurality of electrophoretic particles and an insulating liquid which are held in a container, a first electrode and a second electrode which are disposed close to the insulating liquid, and means for applying voltages between the first electrode and the second electrode, wherein the electrophoretic display device exhibits a display state including a first stats in which the electrophoretic particle are dispersed in the insulating liquid by applying an AC voltage between the first and second electrodes, a second state in which the electrophoretic particles are attracted toward the first electrode by applying a DC voltage of one polarity between the first and second electrodes, and a third state in which the electrophoretic particles are attracted toward the second electrode by applying a DC voltage of the other polarity between the first and second electrodes, and wherein the second and third states are exhibited alternately.

According to the present invention, there is also provided a driving method of an electrophoretic display device comprising a plurality of electrophoretic particles and an insulating liquid which are held in a container, a first electrode and a second electrode which are disposed close to the insulating liquid, and means for applying voltages between the first electrode and the second electrode:

the driving method comprising et least:

a step of creating a first state in which the electrophoretic particle are dispersed in the insulating liquid by applying an AC voltage between the first and second electrodes, a step of creating a second state in which the electrophoretic particles are attracted toward the first electrode by applying a DC voltage of one polarity between the first and second electrodes, and a step of creating a third state in which the electrophoretic particles are attracted toward the second electrode by applying a DC voltage of the other polarity between the first and second electrodes; and wherein the second and third states are to be exhibited alternately.

By using the electrophoretic display device and the driving method thereof according to the present invention, even in the case of effecting the same display for a long time, it is possible to prevent display burning since, at each pixel, a dispersion operation, a first collecting operation and a second collecting operation are successively performed appropriately to create electric fields in different directions.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1(*a*), 1(*b*) and 1(*c*) are schematic sectional views, wherein 1(*a*) is a view for illustrating a dispersion operation, 1(*b*) is a view for illustrating a first collecting operation, and 1(*c*) is a view for illustrating a second collecting operation.

FIGS. 9(*a*) to 9(*d*), FIGS. 10(*a*) to 10(*d*), and FIGS. 11(*a*) to 11(*d*) are schematic views for illustrating first, second and third embodiments, respectively, of the driving method of an electrophoretic display device according to the present invention.

BEST MODE FOR CARRYING OUT THE INVENTION

Hereinbelow, embodiments of the electrophoretic display device and the driving method thereof according to the present invention will be described with reference to FIGS. 1-11.

The electrophoretic display device according to the present invention, as shown in FIGS. 1(a) to 1(c), includes a pair of substrates 1a and 1b disposed with a predetermined spacing therebetween, an insulating liquid 2 and a plurality of electrophoretic particles 3 disposed in the spacing, and a first electrode 4a and a second electrode 4b disposed close to the insulating liquid 2, and is constituted so as to effect display on the basis of movement of the electrophoretic particles under application of a voltage to these electrodes 4a and 4b.

At the spacing between the substrates 1a and 1b, a partition wall 5 may be disposed. The substrates 1a and 1b and the partition wall 5 constitutes a container for containing the electrophoretic particles and the insulating liquid 2. Further, an insulating layer 6 may be disposed so as to cover the first and second electrodes 4a and 4b. The insulating layer 6 may be provided with a recess portion so as to ensure an increase in number of the electrophoretic particles 3 which can be accommodated or corrected by the electrodes, creation of an electric field for permitting efficient movement of the electrophoretic particles 3, and an improvement in aperture ratio.

Further, the electrophoretic display device of the present invention may be of a reflection type or a transmission type.

Figure 3:
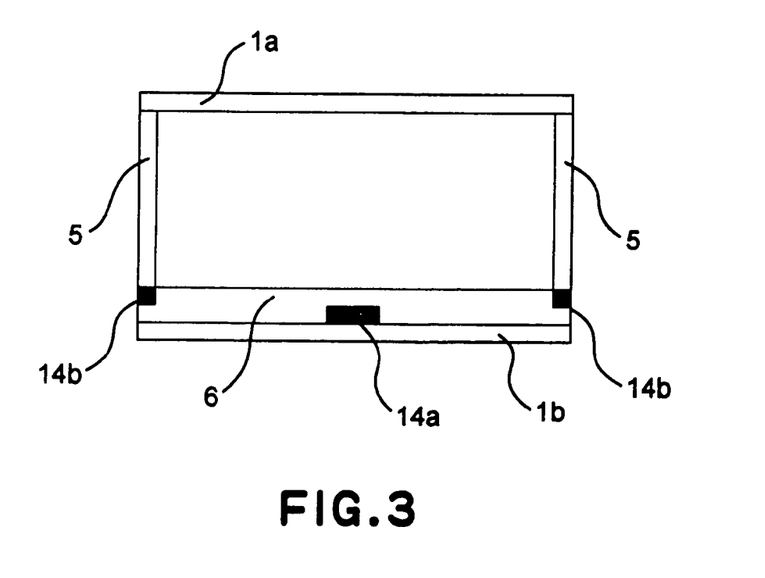
FIG. 3 is a schematic section view showing an embodiment of the electrophoretic display device according to the present invention.
Figure 4:
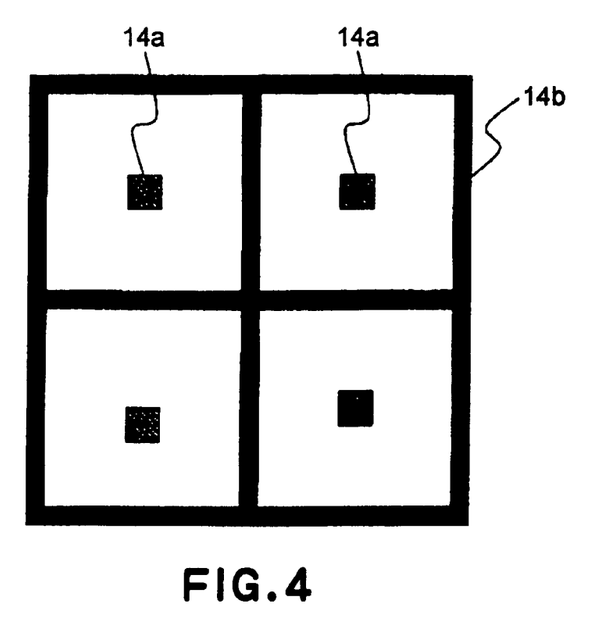
FIGS. 4, 5 and 6 are respectively a schematic plan view showing an embodiment of the electrophoretic display device of the present invention.

The arrangement position of the first and second electrodes 4a and 4b is not restricted to that shown in FIGS. 1(a) to 1(c). For example, as shown in FIG. 3, a first electrode 14a may be disposed at a central portion of pixel and a second electrode 14b may be disposed at a boundary portion of pixel. In such a case, the second electrode 14b may be disposed so as to surround pixels as shown in FIG. 4. In this case, the second electrodes 14b of the respective pixels are electrically connected with each other, so that it is necessary to apply an identical voltage the second electrodes 14b since it is impossible to apply different voltages pixel by pixel. For this reason, in such a case, the voltage applied to the second electrodes 14b may be kept constant (as a reference voltage) at the time of effecting a dispersion operation, a first collecting operation, and a second collecting operation, and the first electrodes 14a may be set to have a voltage higher or lower than the reference voltage. As a result, it is possible to advantageously suppress an electric field interference between pixels since the-voltage at the pixel boundary portion is the constant (reference) voltage which is not changed.

Figure 5:
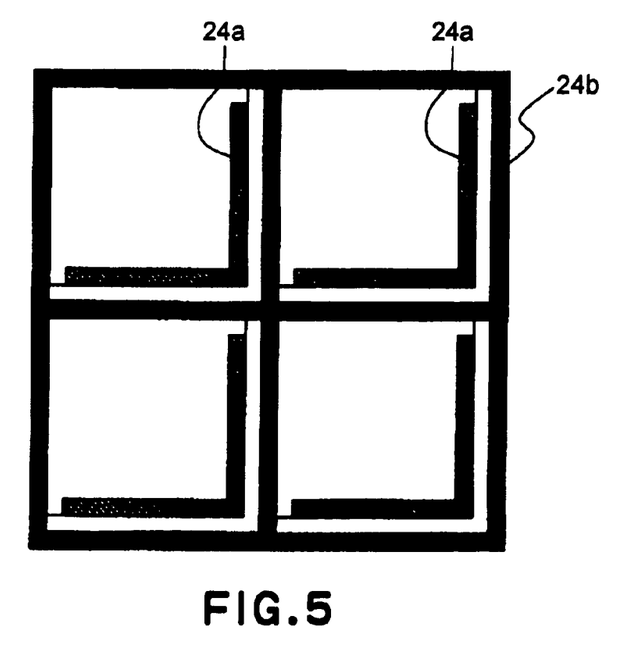
Figure 6:
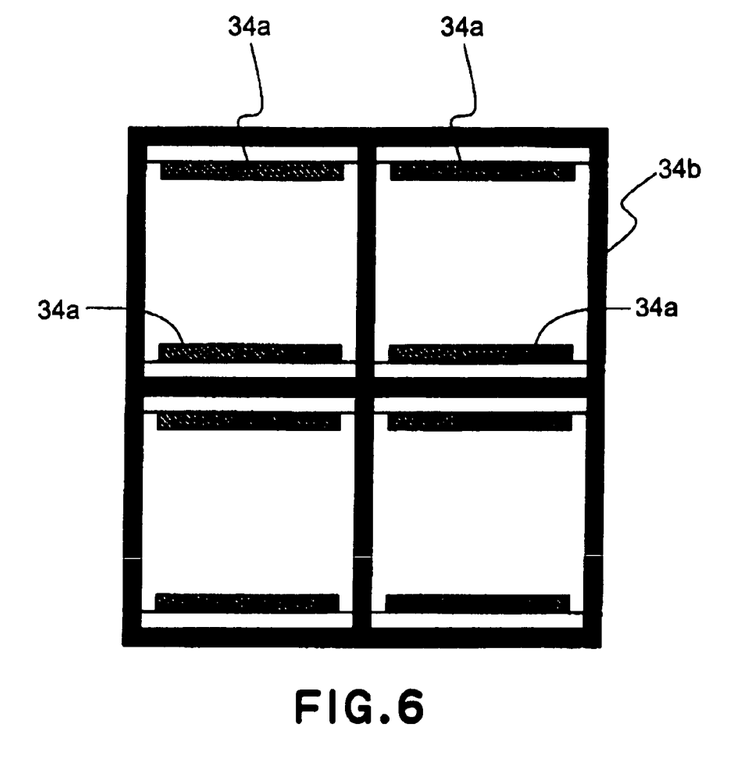

The first electrodes 14 shown in FIG. 4 have a square shape and are disposed at a central portion of each pixel, but may have other shapes and may be disposed at portions other than the central portion. For example, as shown in FIG. 5, first electrodes 24a may be disposed at a portion other than the pixel central portion in a L-shape. Referring to FIG. 5, a reference numeral 24 represents second electrodes. In this case, it is possible to equalize the numbers of electrophoretic particles which can be corrected by the first and second electrodes 24a and 24b. Further, at each pixel, the first electrode is not limited to a single electrode. For example, it is possible to dispose two first electrodes 34 at each pixel as shown in FIG. 6, or dispose three or more first electrodes. Similarly, at each pixel, the number of second electrode may be one or two or more.

Figure 1:
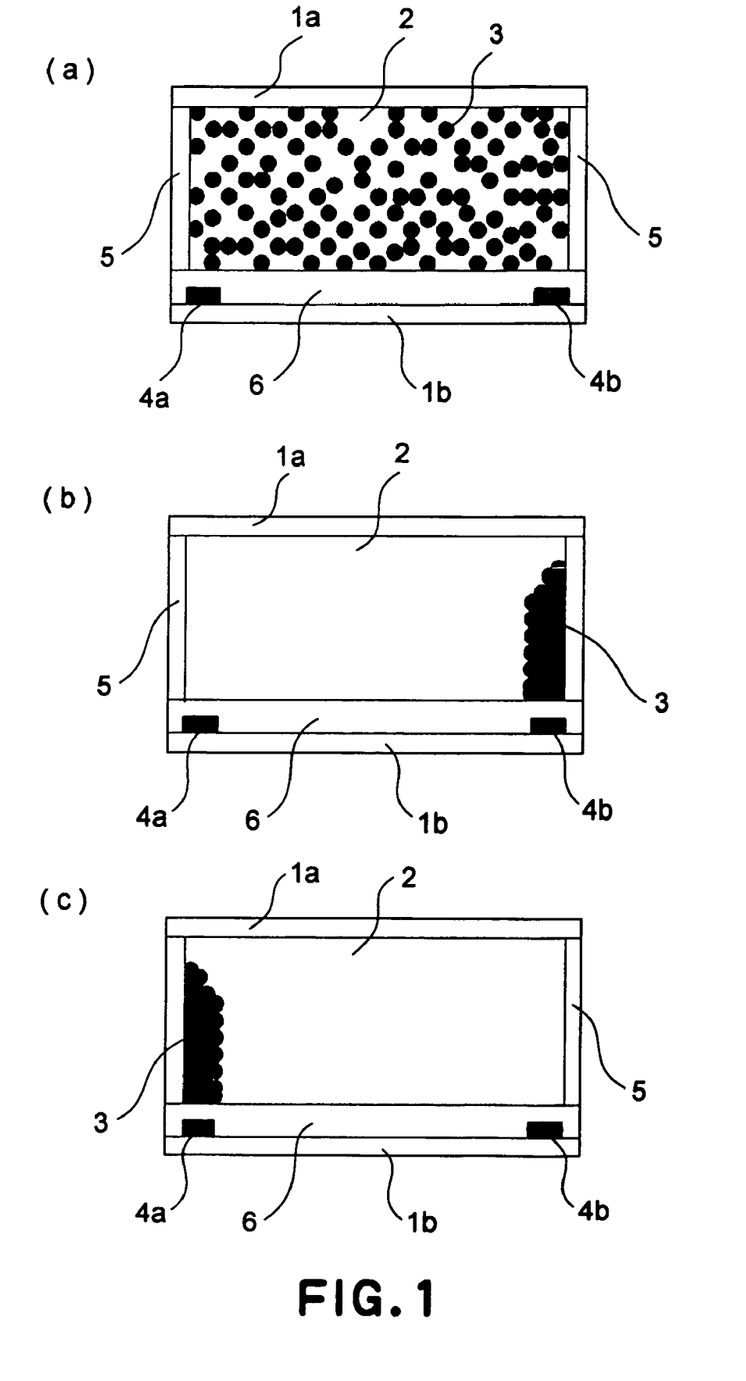

In the electrophoretic display devices shown in FIGS. 1 and 3, the first electrode 4a or 14a and the second electrode 4b or 14b are supported on the same substrate (i.e., of a horizontal movement type), but may be supported on different (opposite) substrates (i.e., of a vertical movement type). For example, the second electrode 14b shown in FIG. 3 is not disposed between the partition wall 5 and the substrate 1b but may be disposed between the partition wall 5 and the substrate 1a. Further, the first electrode 4a or 14a may have a projection form and may have such a height so as to contact the substrate 1a. Further, although the second electrode 4b or 14b is disposed at a part of the partition wall 5 but the entire partition wall 5 may be constituted by the second electrode.

The planar shape of each pixel is not limited particularly but may be any shape including polygons, such as a square, a rectangle and a hexagon, and a circle.

Figure 7:
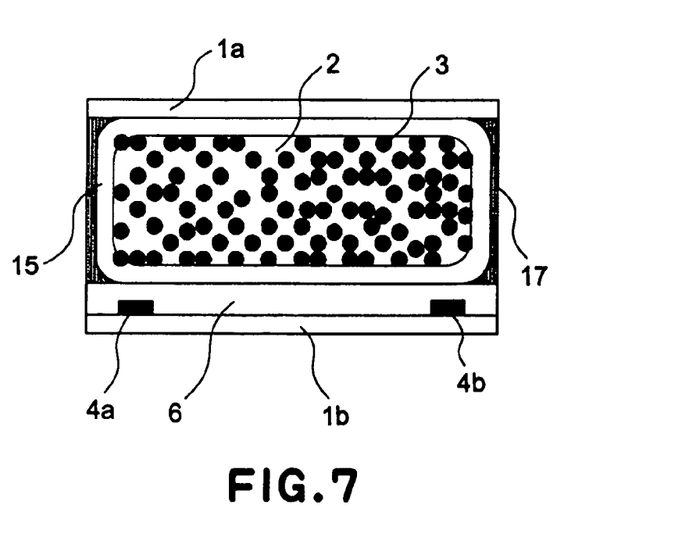
FIG. 7 is a schematic sectional view showing another embodiment of the electrophoretic display device of the present invention.

The partition wall 5 shown in FIGS. 1 and 3 comprises a plate member disposed perpendicular (normal) to the substrates 1a and 1b but may be formed in a microcapsule shape (i.e., such a shell shape that it is disposed not only in the direction of the normal to the substrate 1a and 1b but also along the surfaces of the substrates 1a and 1b), as indicated by a reference numeral 15 in FIG. 7. In this case, the microcapsule partition wall 15 functions as a container for the electrophoretic particles 3 and the insulating liquid 2 and is required to be formed of a transparent material. Further, it is possible to fill a transparent resin binder 17 at a spacing defined by the microcapsule partition wall 15 and the pair of substrates 1a and 1b. The microcapsule partition wall 15 is pressed by the pair of substrates 1a and 1b to be partially flattened, and then the resin binder 17 is cured to fix a partially flattened shape. As the resin binder 17, it is preferable that an ultraviolet curable resin or a thermosetting resin is used. At each pixel, other than a single microcapsule partition wall 15, it is possible to dispose a plurality of microcapsule partition walls 15. The resin binder 17 (for fixing the microcapsule partition wall) may be cured in a plate shape in parallel with the substrate 1b and can be used as a substrate. In this case, such a plate-shaped resin binder may be provided with an electrode or an insulating layer. In this case, however, the electrode may preferably be formed through a low-temperature process which does not require a vacuum treatment such as printing of an organic conductor film.

The electrophoretic display device described above may preferably be formed in an active matrix type display device. More specifically, a shown in FIG. 8, the active matrix type electrophoretic display device include a matrix of scanning lines 50 and data lines 51, and a plurality of switching devices 52 each of which is electrically connected with an associated scanning line 50, an associated data line 51, and an associated first electrode 4a and places the data line 51 and the first electrode 4a in a conduction state or a non-conduction state depending on a signal inputted from the scanning line 50.

Figure 8:
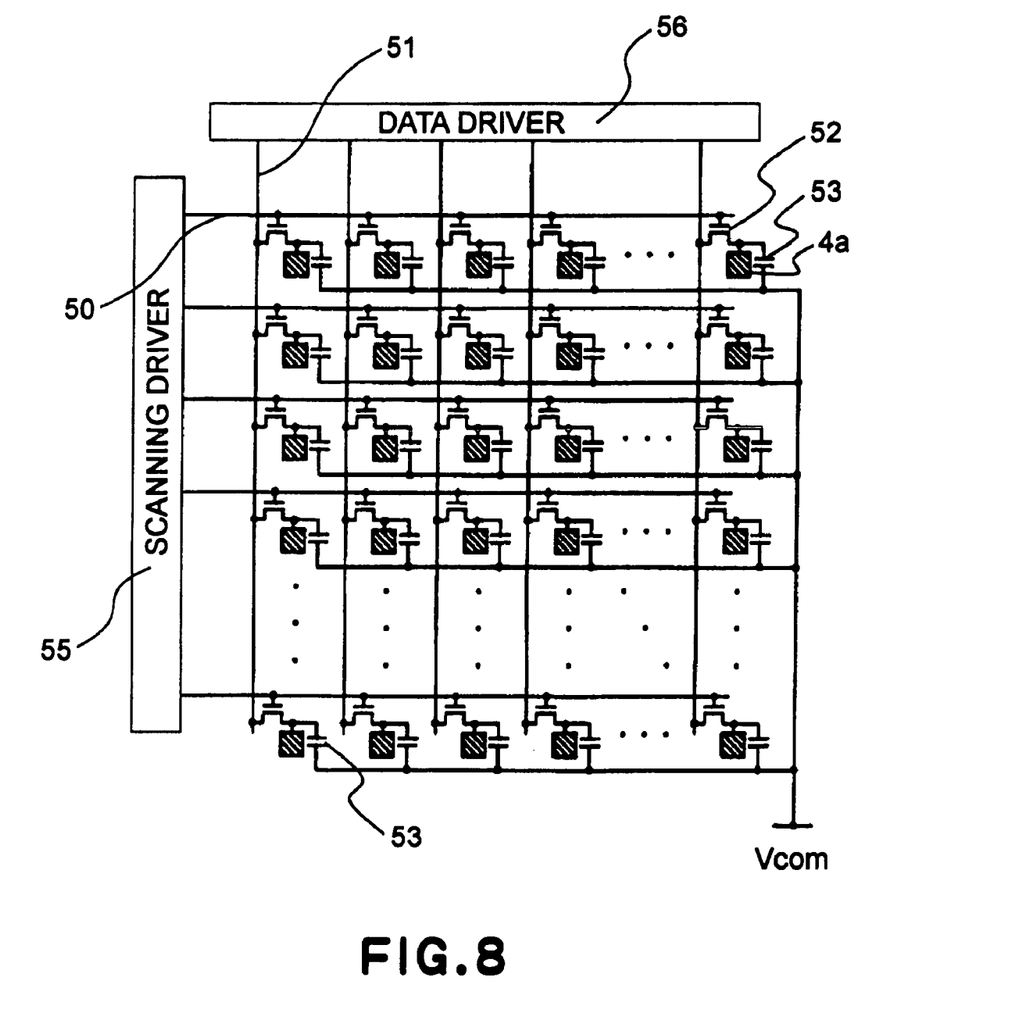
FIG. 8 is a schematic circuit diagram showing an active matrix type electrophoretic display device according to the present invention.

As the switching device 52, it is possible to use a TFT (thin film transistor). The switching device 52 is disposed at each pixel and its drain electrode is connected with the first electrode 4a, preferably at a bottom thereof, so as to apply a signal to the first electrode 4a. A gate electrode of the switching device 52 is connected with the scanning line 50 and a source electrode of the switching device 52 is connected to the data line 51. Further, the electrophoretic display device includes a scanning driver 55 connected with the scanning lines 50 and a data driver 56 connected with the data lines 51. The scanning driver 55 and the data driver 56 may be mounted in the form of a package type driver IC or formed in a common production process with the switching device 52.

Further, the first electrode 4a may be connected with an auxiliary (storage) capacitor 53. When the auxiliary capacitor 53 is once electrically charged, it is possible to continue the movement of the electrophoretic particles 3 by the stored electric charges even if thereafter the switching device 52 is turned off.

In the above described electrophoretic display device, when a certain scanning line 50 is made active, all the switching devices 52 connected with the certain scanning line 50 are placed in an on state. At this time, a voltage outputted from the data driver 56 is applied to the first electrodes 4a via the associated switching devices 52. As a result, the respective second electrodes 4b at associated pixels are electrically connected with each other at least on one scanning line basis, thus being supplied with the same signal. By an electric field created between the first and second electrodes 4a and 4b, the electrophoretic particles 3 are moved.

Figure 2:
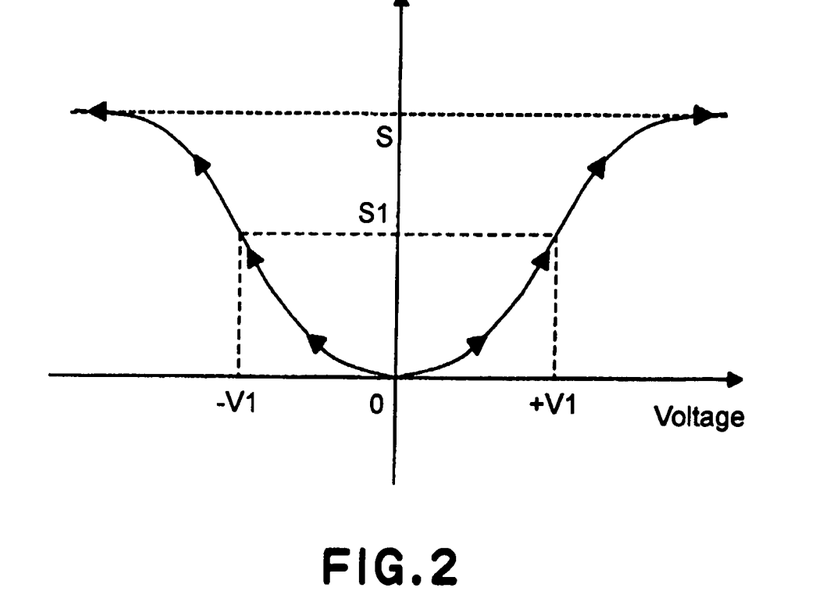
FIG. 2 is a graph showing a relationship between a voltage applied to an electrophoretic display device and a corresponding light intensity.

The electrophoretic display device according to the present invention may preferably exhibit a characteristic curve as shown in FIG. 2 by adjusting the arrangement and structure of the first or second electrode. More specifically, even in either of the cases where the voltage applied to the first electrode is larger and smaller than the voltage applied to the second electrode, it is preferable that an substantially identical display gradation level S1 can be attained if an absolute value |V1| of the voltage applied to the first electrode is identical to that of the voltage applied to the second electrode. Details thereof will be described later.

Next, the driving method of an electrophoretic display device according to the present invention will be described.

According to the driving method of the present invention, the following four steps i), ii), iii) and iv) are performed in this order:

i) a dispersion operation for dispersing the electrophoretic particles 3 in the insulating liquid 2 by applying an AC voltage between the first electrode 4a and the second electrode 4b (FIG. 1(a)), ii) a first collecting operation for attracting the electrophoretic particles 3 toward the first electrode 4a by applying a DC voltage of one polarity between the first and second electrodes 4a and 4b (FIG. 1(b)), iii) a dispersion operation for dispersing the electrophoretic particles 3 in the insulating liquid 2 by applying an AC voltage between the first and second electrodes 4a and 4b (FIG. 1(a)), and iv) a second collecting operation for attracting the electrophoretic particles 3 toward the second electrode 4b by applying a DC voltage of the other polarity between the first and second electrodes 4a and 4b (FIG. 1(c)).

In the above first and second collecting operations, a direction of electric field in the first collecting operation is opposite to a direction of electric field in the second collecting operation.

Figure 9:
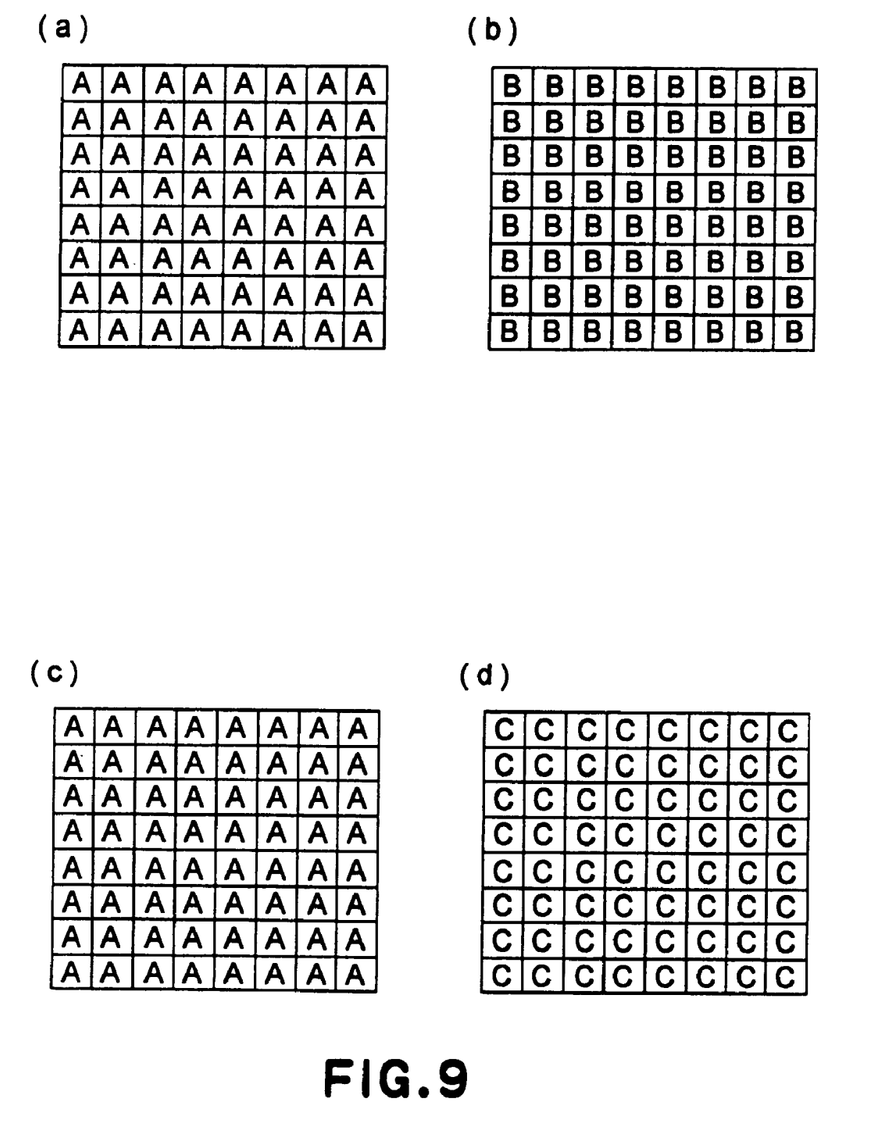

Hereinbelow, three specific embodiments (First to Third Embodiments) of the driving method of the electrophoretic display device of the present invention will be described with reference to FIGS. 9, 10 and 11, respectively. In each of the FIGS. 9, 10 and 11, at (a) is shown an operation state in a first field at respective pixels (8×8=64 pixels), at (b) is shown an operation state in a second (subsequent) field at the respective pixels, at (c) is shown an operation state in a third field at the respective pixels, and at (d) is shown an operation state in a fourth field at the respective pixels. In these figures, A represents a pixel at which the dispersion operation is performed, B represents a pixel at which the first collecting operation is performed, C represents a pixel at which the second collecting operation is performed. In either of the driving methods shown in FIGS. 9, 10 and 11, it is possible to start the driving from any field as long as the fields are repeated in the order of (a), (b), (c) and (d). In these embodiments, one display operation is completed in the first and the second fields (shown at (a) and (b) in each figure) or the third and fourth fields (shown at (c) and (d) in each figure). Accordingly, the first and second fields constitute one frame, and similarly the third and fourth fields constitute one frame.

(1) First Embodiment

In this embodiment, the above described dispersion operation, first collecting operation, dispersion operation, and second collecting operation are performed with respect to substantially all the pixels, at the same timing. More specifically, in the first field, the dispersion operation A is performed at substantially all the pixels (FIG. 9(a)); in the second field, the first collecting operation B is performed at substantially all the pixels (FIG. 9(b)); in the third field, the dispersion operation A is performed at substantially all the pixels (FIG. 9(c)); and in the fourth field, the second collecting operation C is performed at substantially all the pixels (FIG. 9(d)).

Incidentally, as described above, in this embodiment, the first and second fields (FIGS. 9(a) and 9(b)) constitute one frame and the third and fourth fields (FIGS. 9(c) and 9(d)) constitute one frame. Accordingly, the driving method in this embodiment is referred to as an "electrophoretic frame inversion driving method".

(2) Second Embodiment

In this embodiment, the above described dispersion operation, first collecting operation, dispersion operation and second collecting operation are performed with respect to pixels connected to the same scanning line, at the same timing.

Figure 10:
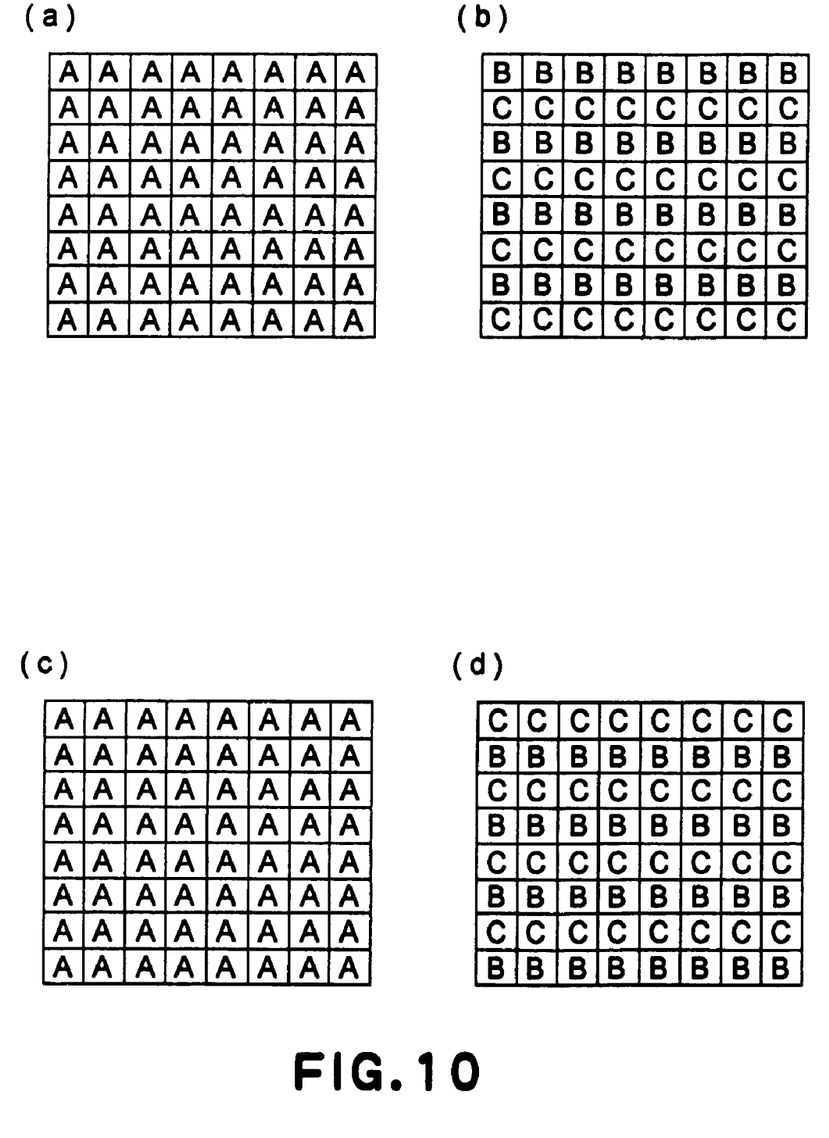

FIG. 10 shows an embodiment of such a driving method.

According to this driving method, the dispersion operations A are performed with respect to substantially all the pixels (FIGS. 10(a) and 10(c)); timing of performing the first collecting operation B at the pixels connected to a scanning line is synchronized with timing of performing the second collecting operation C at the pixels connected to an adjacent scanning line; and timing of performing the second collecting operation C at the pixels connected to a scanning line is synchronized with timing of performing the first collecting operation B at the pixels connected to an adjacent scanning line. In other words, referring to FIGS. 10(b) and 10(d), in the second field (FIG. 10(b)), the first collecting operation B is performed at the pixels connected to odd-numbered scanning lines and the second collecting operation C is performed at the pixels connected to even-numbered scanning lines. On the other hand, in the fourth field (FIG. 10(d)), the second collecting operation C is performed at the pixels connected to odd-numbered scanning lines and the first collecting operation B is performed at the pixels connected to even-numbered scanning lines.

The driving method in this embodiment is referred to as an "electrophoretic line inversion driving method" since the direction of electric field created in the pixels shown in FIGS. 10(b) and 10(d) is inverted every scanning line.

(2) Third Embodiment

In this embodiment, the dispersion operations A are performed with respect to substantially all the pixels (FIGS. 11(a) and 11(c)); timing of performing the first collecting operation B at a pixel is synchronized with timing of performing the second collecting operation C at an adjacent pixel; and timing of performing the second collecting operation C at a pixel is synchronized with timing of performing the first collecting operation B at the pixel.

Figure 11:
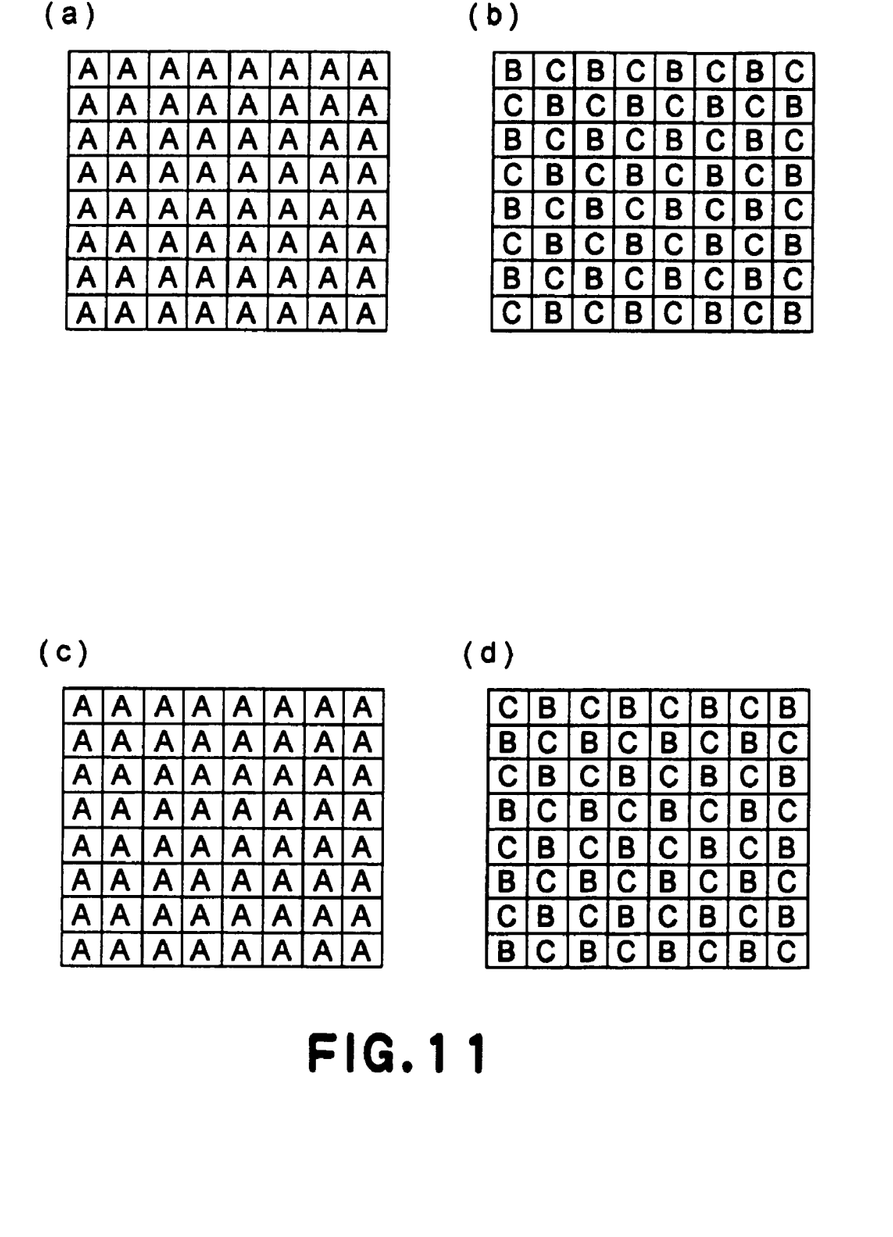

FIG. 11 shows an embodiment of such a driving method.

At mutually adjacent pixels, the first and second collecting operations B and C are performed at different timings (although the dispersion operations A shown in FIGS. 11(a) and 11(c) are performed at the same timing).

The driving method in this embodiment is referred to as an "electrophoretic dot inversion driving methods" since the direction of electric field created in the pixels shown in FIGS. 11(b) and 11(d) is inverted every pixel (dot).

Incidentally, in the above described first collecting operation, it is preferable that halftone image is displayed on the basis of controlled amount of electrophoretic particles 3 to be attracted to the above mentioned first electrode 4a. On the other hand, in the above described second collecting operation, it is preferable that halftone image is displayed on the basis of a controlled amount of electrophoretic particles 3 to be attracted to the above mentioned second electrode 4b. The halftone display can be effected by controlling an application time of or a magnitude of a voltage for moving the electrophoretic particles 3 to adjust an amount of the electrophoretic particles 3 to be attracted to the first electrode 4a or the second electrode 4b.

In the case where display gradation levels are identical to each other, an absolute value of a voltage, to be applied between the first and second electrodes 4a and 4b, for performing the first collecting operation may preferably be substantially equal to an absolute value of a voltage, to be applied between the first and second electrodes 4a and 4b, for performing the second collecting operation.

More specifically, in order to substantially equalize the above described absolute values of the voltages (of different polarities) in the case where display gradation levels are identical to each other, an electrophoretic display device providing a characteristic curve shown in FIG. 2 may preferably be used. FIG. 2 shows an example of a relationship between a voltage applied to the electrophoretic display device and a light intensity (such as a transmitted light intensity for a transmission type electrophoretic display device or a reflected light intensity for a reflection type electrophoretic display device which is used in this embodiment). The abscissa represents a voltage (voltage difference between the first and second electrodes 4a and 4b), and the ordinate represents a corresponding (reflection) light intensity. The characteristic curve is symmetric with respect to a vertical line which intersects the origin O. Further, the characteristic curve has a moderate slope, so that it is possible to control the light intensity by changing the voltage thereby to allow halftone display.

For example, referring to FIG. 2, when the voltage is applied so as to provide a voltage difference, between the first and second electrodes 4a and 4b, of +V1, the first collecting operation is performed to display a halftone image at a gradation level S1. Further, when the voltage is applied between the first and second electrodes 4a and 4b so as to provide a voltage difference therebetween of −V1, the second collecting operation is performed to display a halftone image at a gradation level S1. As the characteristic curve is symmetrical with respect to the line, the resultant display gradation levels (S1) are equal to each other if an absolute value (|V1|) of the voltages +V1 and −V1.

In the case of the dispersion operation, the AC voltage (exactly an AC voltage having equal positive and negative amplitudes) is applied, a resultant voltage difference (time integral value) between the first and second electrodes is 0 V, thus effecting display at a level of the origin O.

Such a characteristic curve varies depending on the structures of the pixels and electrodes. In other words, e.g., the first and second electrodes may be disposed so as to provide the above described characteristic curve.

In the case where the insulating liquid 2 is transparent, an area where the first electrode 4a is disposed is white, and the electrophoretic particles 3 are black; black display is effected at the pixels when the above described dispersion operation is performed (FIG. 1(a)). Further, in the case where the above described first collecting operation or second collecting operation is performed, white display is effected when almost all the electrophoretic particles 3 are attracted to the first electrode 4a or the second electrode 4b. Further, when an amount of collection of the electrophoretic particles 3 to the first or second electrode 4a or 4b is adjusted by changing the voltage application time or the magnitude of the voltage, it is possible to effect halftone display depending on the collection amount. With respect to pixels where the black display state is retained, a voltage identical in absolute value to that of the second electrode 4b is applied to the first electrode 4a.

Effects of this embodiment will be described.

According to this embodiment, even in the case of effecting the same display for a long time, at the respective pixels, the dispersion operation, the first collecting operation or the second collecting operation are successively performed. As a result, electric fields directed in different directions are applied. For example, in the case of the dispersion operation, an average of effective voltage applied to the pixels becomes zero since the AC voltage is applied. Further, also in the case of the first collecting operation and the second collecting operation, the directions of the electric fields are opposite to each other, so that an average of effective voltages is zero. As a result, it is possible to prevent localization of counter electric charges such as ions present in the dispersion liquid, so that it becomes possible to avoid display burning due to adhesion of the electrophoretic particles to the pixel inner wall portion or mutual agglomeration of the electrophoretic particles. Therefore, it is possible to effect display repetitively stably.

Further, it has been originally difficult for the electrophoretic display device to realize the frame inversion driving method, the line inversion driving method and the dot inversion driving method as in a liquid crystal display device since the electrophoretic display device uses voltages of different polarities. However, in the present invention, there inversion driving methods can be realized as the electrophoretic frame inversion driving method, the electrophoretic line inversion driving method, and the electrophoretic dot inversion driving method, by using the active matrix type electrophoretic display device. As a result, it becomes possible to realize repetitive stable display with no adhesion and agglomeration. In addition, if rewriting of display state can be performed quickly, it becomes possible to effect motion picture display. Generally, in the electrophoretic line inversion driving method and the electrophoretic dot inversion driving method, the polarity of the voltage applied to the data lines at the time of image displays is alternately switched between positive and negative, so that the change in voltage of auxiliary capacitor is averagely decreased, thus allowing suppression of crosstalk between the scanning lines.

Next, another specific embodiment of the electrophoretic display device of the present invention will be described with reference to FIG. 13.

Figure 13:
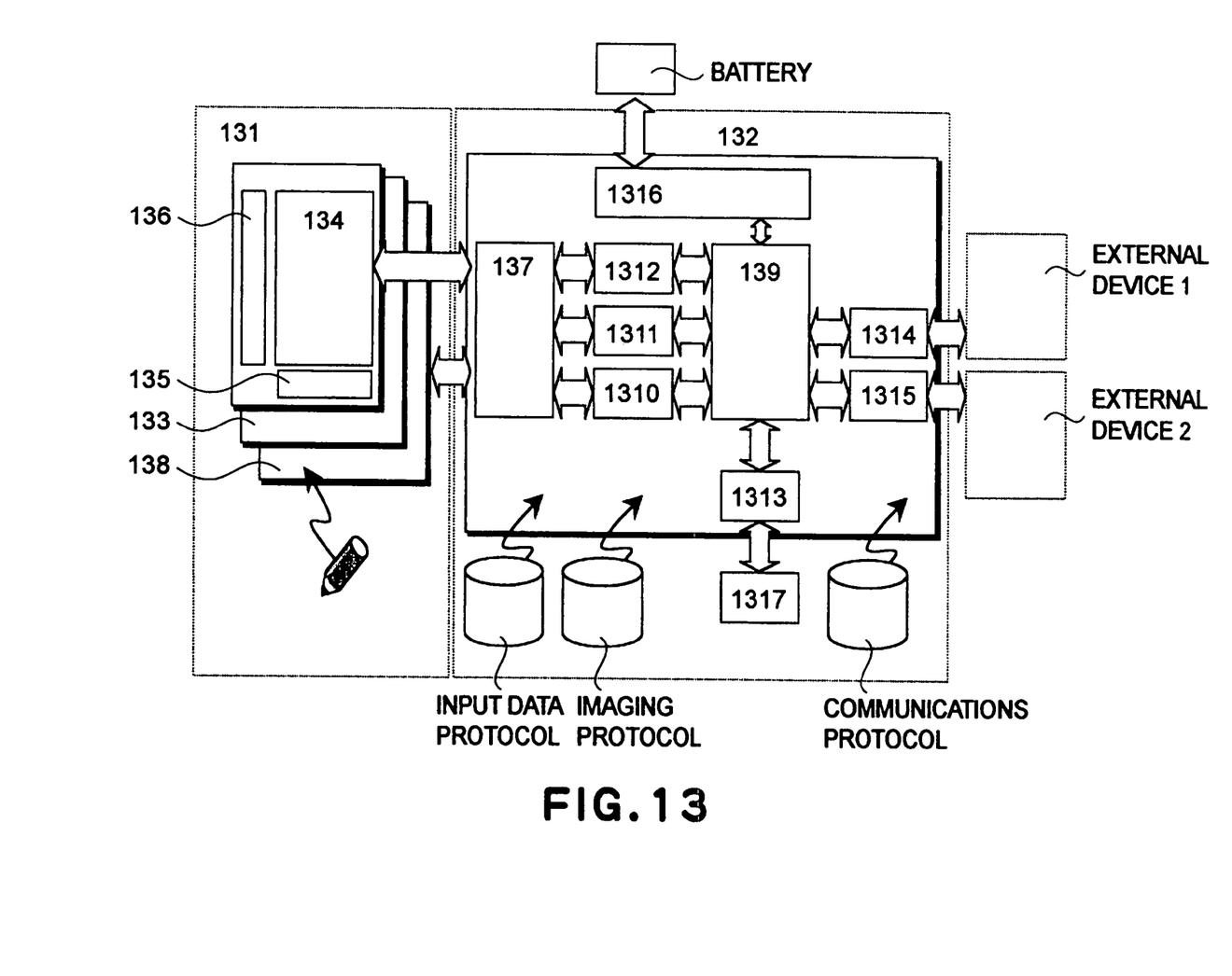
FIG. 13 is a block diagram showing functions of equipment system using the electrophoretic display device of the present invention.

FIG. 13 is a block diagram showing a paper (-like) display using the electrophoretic display device of the present invention and functions of equipment system using the photosensitive drum.

The system is roughly divided into two blocks including a photosensitive drum module 131 and a photosensitive drum system module 132. The photosensitive drum module 13 includes a photosensitive drum device array 133, a drive backplane 134, a drive circuit (X) 135, and a drive circuit (Y) 136. In some cases, the photosensitive drum module 131 further includes a panel controller (not shown) for supplying a power and a signal to the drive backplane 134, and the drive circuits (X) 135 and (Y) 136. A panel interface module 137 functions as the panel controller in some cases. Further, the photosensitive drum module 131 may further include a temperature detection device (not shown) such as a thermocouple or a thermistor. The photosensitive drum module 131 further includes a digitizer 138 in some cases. The digitizer 138 can utilize various systems, such as an electromagnetic induction system, a resistance film system, and an optical reading system using a pen having functions of an image sensor, data processing and data transfer.

The photosensitive drum system module 132 includes principally a central processing controller 139 (generally an MPU (micro processor unit)); a panel control function block for controlling the photosensitive drum, including graphic controller 1310, a panel control block 1311, an input data processor 1312, etc.; a memory interface 1313 which controls an external memory 1317; a communication function block which effects communication with external data through a wire interface 1314 or a wireless interface 1315; and a power control block 1316. In the photosensitive drum system module 132, an OS (operating system) for operating various applications or an application software is installed but detailed explanations thereof are omitted herein.

In this embodiment, it is possible to adopt various hardware configurations. For example, the driving circuit (X) 135 and the driving circuit (Y) 136 can be monolithically formed on the drive backplane 134 in some cases. This is similarly true for the digitizer 138.

Data transmission and reception between the photosensitive drum module 131 and the photosensitive drum system module 132 can be effected through a wire system or a wireless system. In the case of using the wireless system, the photosensitive drum module 131 is required to have a power function or a power-generating function or a function of giving and receiving of energy in the wireless mode.

In this embodiment, the photosensitive drum module 131 and the photosensitive drum system module 132 are shown in a one-to-one relationship but may be an n-to-one relationship.

INDUSTRIAL APPLICABILITY

As described above, the electrophoretic display device according to the present invention is applicable to photosensitive drum as display units for various electronic equipments, such as PDA (Personal Digital Assistance), tablet PC, electronic notebook, electronic text book, document viewer, electronic book, electronic newspaper, etc.

The invention claimed is:

1. An electrophoretic display device, comprising:
    a plurality of electrophoretic particles and an insulating liquid which are held in a container,
    a first electrode and a second electrode which are disposed close to said insulating liquid, and
    means for applying voltages between said first electrode and said second electrode,
    wherein said electrophoretic display device exhibits a display state including a first state in which said electrophoretic particles are dispersed in said insulating liquid by applying an AC voltage between said first and second electrodes, a second state in which said electrophoretic particles are attracted toward said first electrode by applying a DC voltage of one polarity between said first and second electrodes, and a third state in which said electrophoretic particles are attracted toward said second electrode by applying a DC voltage of the other polarity between said first and second electrodes,
    wherein the second and third states are exhibited alternately, and
    wherein the second and third states created by applying the DC voltages having an identical absolute value are substantially the same visual recognition state.

2. A device according to claim 1, wherein said first and second electrodes are disposed symmetrically.

3. A driving method of an electrophoretic display device comprising a plurality of electrophoretic particles and an insulating liquid which are held in a container, a first electrode and a second electrode which are disposed close to said insulating liquid, and means for applying voltages between said first electrode and said second electrode:
    said driving method comprising at least:
    a step of creating a first state in which said electrophoretic particles are dispersed in said insulating liquid by applying an AC voltage between said first and second electrodes,
    a step of creating a second state in which said electrophoretic particles are attracted toward said first electrode by applying a DC voltage of one polarity between said first and second electrodes, and
    a step of creating a third state in which said electrophoretic particles are attracted toward said second electrode by applying a DC voltage of the other polarity between said first and second electrodes; and
    wherein the second and third states are exhibited alternately, and
    wherein the second and third states created by applying the DC voltages having an identical absolute value are substantially the same visual recognition state.

4. A method according to claim 3, wherein said step of creating the first state is performed in advance of said step of creating the second state and said step of creating the third step.

* * * * *